Patented June 9, 1936

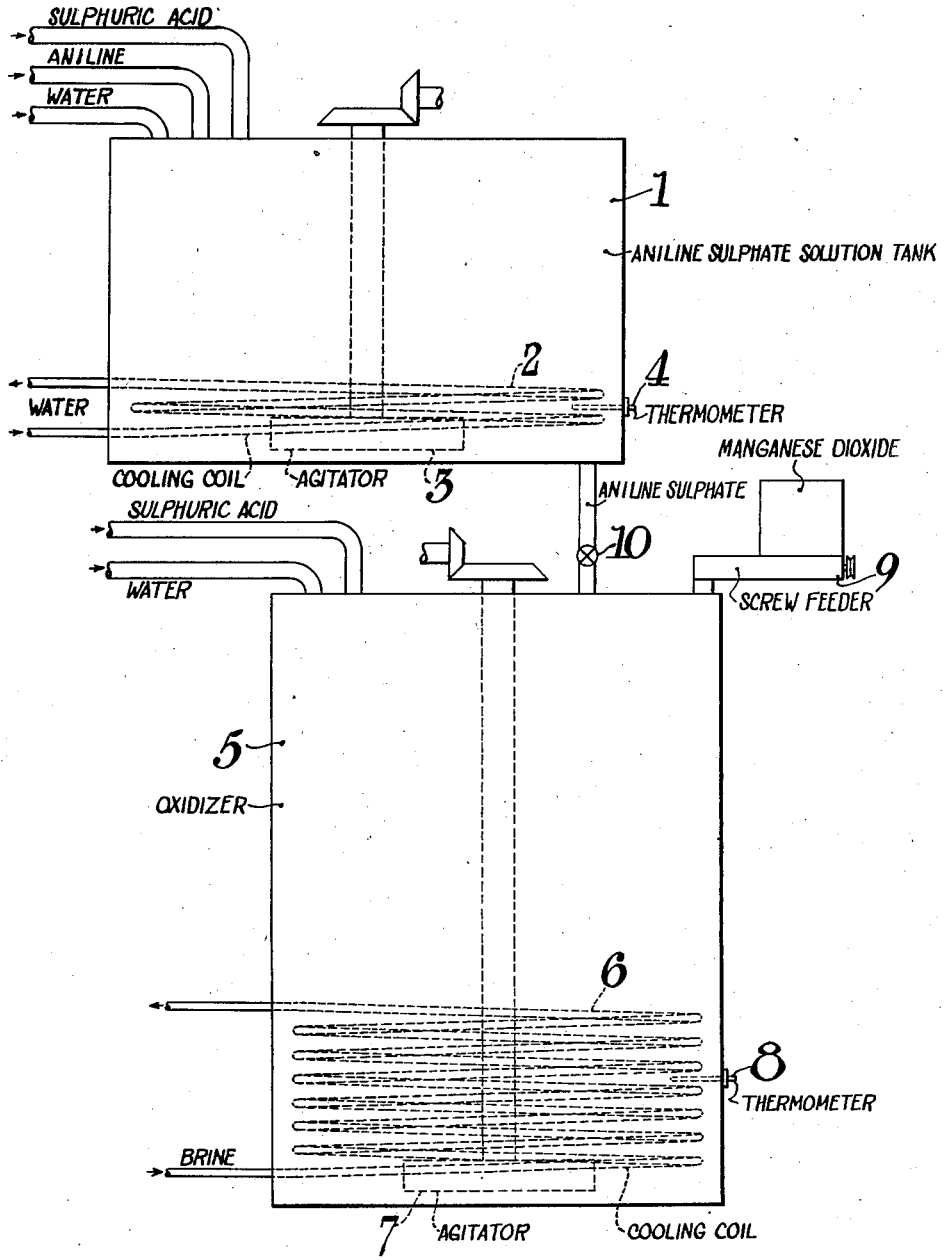

2,043,912

UNITED STATES PATENT OFFICE 2,043,912

PROCESS OF MAKING QUINONE

Harold Von Bramer and Albert C. Ruggles, Kingsport, Tenn., assignors to Eastman Kodak Company, Rochester, N. Y., a corporation of New York Application February 15, 1935, Serial No. 6,719

6 Claims. (Cl. 260—56)

This invention relates to the manufacture of quinone from aniline, and more particularly to the manufacture of quinone by oxidizing aniline by means of manganese dioxide and sulfuric acid.

It is known that aniline can be oxidized to quinone by means of sulfuric acid and powdered manganese dioxide. It has also been known that it is advantageous, from the standpoint of yields obtained, gradually to add the aniline, in the form of aniline sulfate solution, to a well-stirred mixture of manganese dioxide and sulfuric acid, rather than to add the oxidizing mixture to the aniline sulfate solution. In order to insure economical yields of quinone in this process, it has always been necessary to use very high grades of manganese dioxide ore (85-90% $MnO_2$), and also to employ a considerable excess of manganese dioxide, i. e., to have present at all times during the conduct of the reaction a considerable excess of manganese dioxide over the aniline sulfate available for reaction with the manganese dioxide. This excess cannot be recovered without expensive processing.

We have discovered that by gradually running an aniline sulfate solution into an oxidizing mixture of manganese dioxide and sulfuric acid, and at the same time running in manganese dioxide at such a rate that the amount of manganese dioxide present in the oxidizer is (except at the beginning of the reaction) only slightly in excess of that theoretically necessary to oxidize the aniline being run in, it is possible to use a lower grade of manganese dioxide (pyrolusite) ore, to use a smaller amount of manganese dioxide than has hitherto been found necessary to oxidize a given amount of aniline, and to obtain a higher yield of quinone than has hitherto been obtained. For instance, we have been able, in our improved process, to use pyrolusite ore of 70% $MnO_2$ content, to use from 18 to 19% less manganese dioxide than has been customary, and to obtain considerably higher yields than are obtained when the aniline sulfate solution is simply added to the whole amount of manganese dioxide and sulfuric acid.

When we speak of the gradual addition of aniline sulfate and manganese dioxide, we mean, of course, addition in continuous streams or intermittently in small increments. The intent of the gradual addition is to add the entire quantities of the aniline sulfate solution and of the manganese dioxide over a considerable period of time, at such rates that the addition of the two substances is completed at about the same time, and in such proportions that a slight excess of manganese dioxide is maintained in the reaction mixture throughout the oxidation.

Our process may, for example, be carried out in an apparatus such as is diagrammatically represented in the attached drawing, forming a part of the specification. In the figure, I represents a tank, fitted with a cooling coil 2, an agitator 3, and a thermometer 4. 5 represents a second tank, hereinafter referred to as the oxidizer, fitted with a cooling coil 6, an agitator 7, and a thermometer 8. To this oxidizer tank 5 are also attached a screw feeder 9 having a variable speed control, such as a Gauntt feeder, and a throttle valve 10 leading from the tank 1.

As an example of carrying out our invention, we may proceed as follows, using the apparatus shown in the drawing. In the tank 1, 158.3 lbs. of aniline is dissolved in a dilute acid consisting of 200 gals. of water and 475 lbs. of sulfuric acid (66° Bé.). During the dilution of the acid and the solution of the aniline therein, the agitator 3 is kept in motion, and cold water is run through the cooling coil 2, until the temperature of the solution, as measured by the thermometer 4, has fallen to room temperature. In the oxidizer tank 5, 75 lbs. of 85% manganese dioxide, ground to pass a 200 mesh sieve, is added to a strong acid consisting of 237.5 lbs. of sulfuric acid (66° Bé.) and 30 gals. of water. The manganese dioxide is kept in suspension in the acid by rapid agitation by the agitator 7, and cold brine is run through the cooling coil 6. When the temperature in the oxidizer, measured by the thermometer 8, has reached 5-8° C., the aniline sulfate solution is slowly run in from the tank 1 through the throttle valve 10, care being taken that the temperature does not rise above 8° C. The valve is so adjusted that from 5 to 5½ hours is required to run the whole charge of aniline sulfate into the oxidizer. While the aniline sulfate solution is being run in, the remainder of the manganese dioxide (308 lbs.) is fed into the oxidizer by means of the screw feeder 9, at such a rate that the manganese dioxide present in the oxidizer is always slightly in excess of that theoretically necessary to oxidize the aniline (sulfate) which is being added. After all the aniline sulfate solution and manganese dioxide have been run into the oxidizer, stirring of the mixture is continued for some hours longer, in order to secure a complete oxidation.

Although the above example is only illustrative of the method of carrying out our improved process, and we are not to be limited by it except as indicated in the appended claims, an analysis of this example may serve to make the principle of our invention more clear.

Disregarding the mechanism of the oxidation, we may write the equation for it, in terms of final products, as follows:

$$2C_6H_5-NH_2 + 4MnO_2 + 5H_2SO_4 \rightarrow$$
$$(2 \times 93 = 186) \ (4 \times 87 = 348) \ (5 \times 98 = 490)$$
$$2O=C_6H_4=O + (NH_4)_2SO_4 + 4MnSO_4 + 4H_2O$$

or, in two steps:—

$$2C_6H_5-NH_2 + H_2SO_4 \rightarrow (C_6H_5-NH_2)_2.H_2SO_4$$
$$(98)$$

$$(C_6H_5-NH_2)_2.H_2SO_4 + 4MnO_2 + 4H_2SO_4 \rightarrow$$
$$(4 \times 98 = 392)$$
$$2O=C_6H_4=O + (NH_4)_2SO_4 + 4MnSO_4 + 4H_2O$$

In the example,—

Aniline used = 158.3 lbs. = 85.11% of 2 g.-moles.

Sulfuric acid needed to make aniline sulfate = 85% of 98 = 83.4 lbs.

Sulfuric acid actually added to aniline = 475 lbs. of 93.2% (66° Bé.) acid = 442.7 lbs.

Excess sulfuric acid used in making aniline sulfate solution = 442.7 − 83.4 = 359.3 lbs.

Sulfuric acid put in oxidizer tank = 237.5 lbs. of 93.2% (66° Bé.) acid = 221.35 lbs.

Total sulfuric acid used in addition to that combined in aniline sulfate = 359.3 + 221.35 = 580.65 lbs.

Sulfuric acid theoretically needed for oxidation = 85% of 392 = 334 lbs.

Overall excess of sulfuric acid used = 580 − 334 = 246 lbs.

Manganese dioxide (85%) ore used = 75 lbs. + 308 lbs. = 383 lbs. ore = 325.55 lbs. manganese dioxide used.

Manganese dioxide theoretically needed = 85% of 348 = 295 lbs.

Excess manganese dioxide used = 325 − 295 = 30 lbs. = only about 10% excess.

It will be seen that a slight excess (7½%) of sulfuric acid over all that needed for both steps is added in making the aniline sulfate. This corresponds roughly to the slight excess (10%) of manganese dioxide used. The 221 lbs. of sulfuric acid put into the oxidizer is an additional excess. It has been known that it is advantageous to use a large excess of sulfuric acid in oxidizing aniline to quinone by means of manganese dioxide and sulfuric acid. We do not attempt to explain the function of this excess acid. It may be that it renders intermediate products of the oxidation more soluble. In the example given, we have chosen to add the excess of sulfuric acid in making the aniline sulfate, but it may be introduced into the reaction mixture in some other way.

The oxidation reaction proceeds rapidly at first, from 80 to .84% of the aniline being found to be oxidized two hours after the completion of the addition of the aniline sulfate to the oxidizer. The time required for oxidation to this extent is independent of the grade of pyrolusite ore used. To complete the oxidation, obtaining a 90—92% yield, requires, as has been indicated in the example, that the reaction mixture be stirred for some hours longer. The length of time required for this stage of the reaction depends upon the grade of ore used. With a high grade ore, the oxidation is completed in four hours after all the aniline sulfate has been added. Lower grade ores require as much as 24 hours to give maximum yields. However, we have consistently obtained yields of 90—92% of theoretical, regardless of the grade of ore used. This is a considerable increase over the yields obtained when operating according to the prior art.

In the example, in which a high-grade ore is used, it will be noted that approximately 20% of the total amount of ore to be used is initially added to the oxidizer. When a 70% domestic pyrolusite is used, it is found preferable to add approximately 25% of the ore initially. The rate of addition of ore during the addition of aniline sulfate will, therefore, be slightly lower. The temperature of the reaction mixture is preferably maintained between 8° and 12° C. in this case, instead of between 5° and 8° C.

What we claim as our invention and desire to be secured by Letters Patent of the United States is:

1. In a process of manufacturing quinone by oxidizing aniline by means of manganese dioxide and sulfuric acid only, the step which comprises gradually adding aniline sulfate and manganese dioxide to the reaction mixture.

2. In a process of manufacturing quinone by oxidizing aniline by means of manganese dioxide and sulfuric acid only, the step which comprises gradually adding aniline sulfate and manganese dioxide to the reaction mixture, at such a rate that the amount of manganese dioxide present in the reaction mixture is always slightly in excess of that theoretically necessary to oxidize the aniline present.

3. In a process of manufacture quinone by oxidizing aniline by means of manganese dioxide and sulfuric acid only, the step which comprises gradually adding aniline sulfate and manganese dioxide to the reaction mixture, and maintaining the components of the reaction mixture in intimate contact with each other for several hours after all the aniline sulfate and manganese dioxide have been added.

4. In a process of manufacturing quinone by oxidizing aniline by means of manganese dioxide and sulfuric acid only, the steps which comprise gradually adding aniline sulfate and manganese dioxide to the reaction mixture, at such a rate that the amount of manganese dioxide present in the reaction mixture is always slightly in excess of that theoretically necessary to oxidize the aniline present, and maintaining the components of the reaction mixture in intimate contact with each other for several hours after all the aniline sulfate and manganese dioxide have been added.

5. In a process of manufacturing quinone by oxidizing aniline by means of manganese dioxide and sulfuric acid only, the step which comprises gradually adding aniline sulfate and manganese dioxide to the reaction mixture, in the presence of a large excess of sulfuric acid.

6. In a process of manufacturing quinone by oxidizing aniline by means of manganese dioxide and sulfuric acid only, the step which comprises gradually adding aniline sulfate and manganese dioxide to the reaction mixture, at such a rate that the amount of manganese dioxide present in the reaction mixture is always slightly in excess of that theoretically necessary to oxidize the aniline present, and in the presence of a large excess of sulfuric acid.

HAROLD VON BRAMER.
ALBERT C. RUGGLES.